June 29, 1965  R. G. HOFFMANN  3,191,318

MATHEMATIC TEACHING AID

Filed April 27, 1962

Robert G. Hoffmann
INVENTOR.

3,191,318
MATHEMATIC TEACHING AID
Robert G. Hoffmann, 1726 NW. 10th Terrace,
Gainesville, Fla.
Filed Apr. 27, 1962, Ser. No. 190,625
4 Claims. (Cl. 35—34)

The present invention generally relates to teaching aids, and more particularly to a teaching aid for mathematics and related subjects such as statistics.

In many instances it has been found that a visual representation of various mathematical expressions as well as many statistical problems has greatly enhanced their comprehension, accordingly, one of the primary purposes of the present invention is the provision of a physical means which can be manipulated so as to provide a visual representation of various types of mathematical expressions or statistical problems.

Another significant object of the present invention is the provision of a device which is equally adaptable for use in illustrating basic mathematical operations as well as advanced mathematical expressions.

Also, an object of the present invention is the provision of a means for quickly illustrating various principles of both mathematics and statistics.

Likewise, an object of the present invention is the provision of a device which is simple in construction, inexpensive to manufacture, highly durable, and adaptable for use in a wide range of situations.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
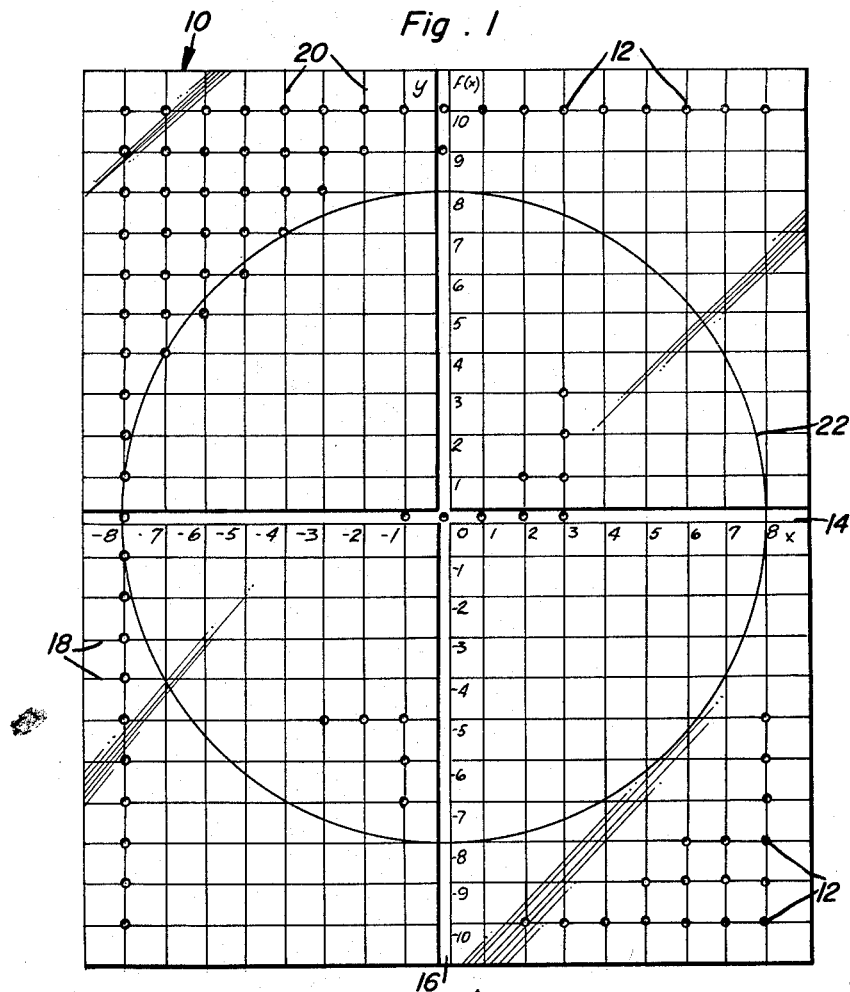
FIGURE 1 is a top plan view illustrating the device comprising the present invention.

Referring now more particularly to the drawings, reference numeral 10 generally designates the board forming the working surface of the invention. This board 10, formed of any conventional substantially rigid material such as wood, metal or plastic, is rectangular in shape and partially perforated with a plurality of small holes 12 provided in the pattern of a rectangular grid and representing points in two dimensional space. The board 10 further includes a horizontal groove 14 and a vertical groove 16 in the face thereof, which grooves are intended to represent rectangular coordinate axes. Further, as noted in FIGURE 1, the surface of the board 10 is provided with a plurality of thin horizontal lines 18 and thin vertical lines 20 extending through the centers of the small holes thereby further accentuating the pattern of the rectangular grid formed by the holes. It will be noted that the provision of such lines creates a resemblance of the board to a sheet of rectangular coordinate graph paper. A circle 22, useful for polar coordinates, is also provided on the working surface of the board 10 in conjunction with the horizontal and vertical lines 18 and 20. Further, it is contemplated that the preferred embodiment of the board 10 be provided with numerical and alphabetical indications corresponding to the axes 14 and 16 and the grid lines 18 and 20, thereby further facilitating the rapid comprehension and expression of various matters.

Figure 2:
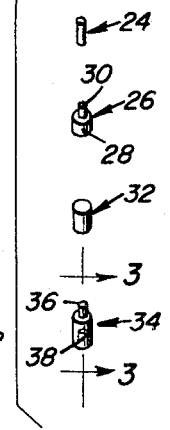
FIGURE 2 is a perspective group view of the various indicators used in conjunction with the board illustrated in FIGURE 1.
Figure 3:
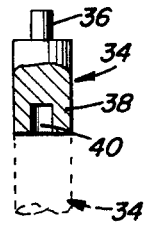
FIGURE 3 is a cross-sectional view taken substantially on a plane passing along line 3—3 in FIGURE 2.

FIGURE 2 is now specifically referred to as illustrating a variety of indicators which are intended to be used with the board 10. A first indicator 24 consists of an elongated pin of a size so as to fit within the holes 12 and project slightly therebeyond. The second indicator 26 illustrated in FIGURE 2 consists of an enlarged base 28 of a size to fit within and be slid along the grooves 14 and 16, and, a reduced upper end portion 30 of the same diameter as the pin 24 and adapted to project an equal distance therewith from the working surface of the board 10. The third indicator 32 consists of an enlarged pin capable of being received in and slid along the grooves 14 and 16 in the same manner as the base 28 of the indicator 26. However, it will be noted that the enlarged pin 32 is of the same diameter throughout. Finally, FIGURE 2 illustrates a fourth indicator 34 particularly adaptable for studying statistical methods as shall be pointed out presently. This fourth indicator 34 includes a reduced upper end portion 36 capable of being accommodated within the holes 12, and an enlarged base portion 38 capable of reception within the grooves 14 and 16. As illustrated in FIGURE 3, it will be noted that the enlarged base 38 is additionally provided with a blind bore 40 therein capable of mating with the reduced upper end 36 of a similar indicator 34.

Figure 4:
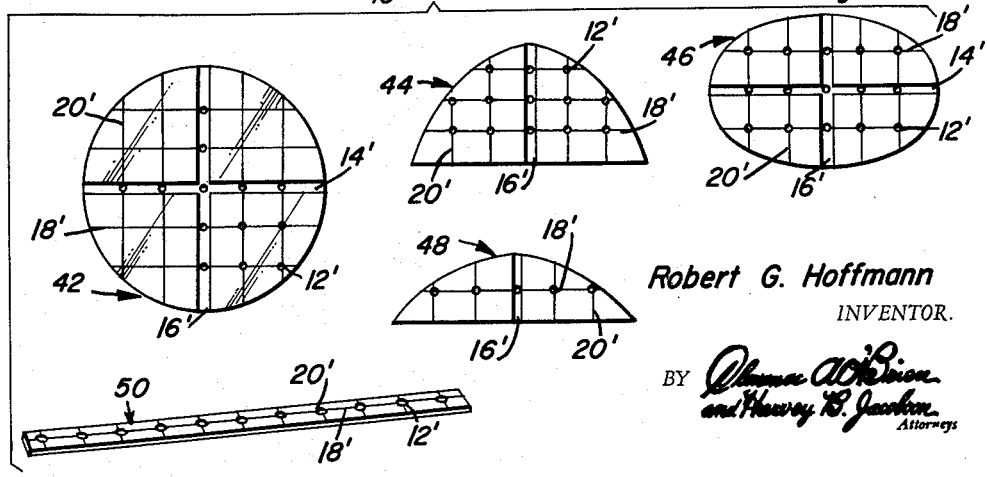
FIGURE 4 is a group view illustrating various mathematical forms which are used in conjunction with the board illustrated in FIGURE 1.

FIGURE 4 illustrates various mathematical forms which are constructed in the same manner and of the same material as the board 10, such forms being similarly provided with holes 12', grooves 14' and 16', and horizontal and vertical lines 18' and 20', all corresponding to the holes 12, grooves 14 and 16, and lines 18 and 20 of the board 10. The specific illustration of a circle 42, parabola 44, ellipse 46, hyperbola 48, and line 50 is not intended as a limitation to only these forms as any other desirable forms can obviously be used within the scope of the present invention. These various mathematical forms are connected to the surface of the board 10 by means of the upwardly extending ends of the indicators, specifically indicators 24, 32 and 26.

From the foregoing description taken in conjunction with the drawings, it is readily apparent that a novel teaching aid has been defined which enables the user thereof to, by the manipulation of the indicators and mathematical forms in various ways, express many mathematical expressions and operations ranging from simple counting operations to expressions from advanced mathematics, the surface of the board being particularly adaptable so as to trace the motions thereon as the manipulations are made.

As stated supra, the fourth indicator 34 is particularly provided for use with the board as an aid in studying statistical methods. It is contemplated that these indicators be made in various lengths with the lengths and numbers of indicators being proportional to a given mathematical frequency distribution. Examples of such mathematical frequency distributions being the normal, gamma and rectangular distributions.

Randomly selected indicators from a given distribution simulate a random sample, and, inasmuch as these indicators are made so that they can be stacked on one another, the length of a given randomly selected indicator can be altered by adding other indicators to it. Alteration of the lengths of the indicators is necessary so that fixed and random effects can be simulated. When indicators for a given problem are drawn and stacked, the length of each stack of indicators is measured. These measurements provide the statistical data to be analyzed. Of significance is the fact that a physical analog to the statistical method being studied is provided by the indicators set upon the board. Accordingly, it is apparent that many statistical problems can be simulated by the use of the present device, examples of which are single factor experiments, randomized block, latin squares, and many other statistical experimental design problems.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A mathematical teaching aid comprising a flat board provided with a plurality of holes in one face thereof, said holes being arranged in the pattern of a rectangular grid representing points in two dimensional space, said board further including, in said one face, a single horizontal centrally orientated groove and a single vertical centrally orientated groove representing rectangular coordinate axes, horizontal and vertical lines extending through the centers of all of the holes so as to provide a rectangular graph on said one face, and indicators freely receivable within said holes and said grooves in a manner so as to project outwardly therefrom, and a plurality of rigid planar mathematical forms, said forms each being smaller than the board and selectively positionable on said one face thereof in overlying relation to the holes, grooves and lines thereon, said forms including holes, grooves and lines of the same size and spacing as the board holes, grooves and lines within the limit of each form, said forms being releasably securable to said board by said indicators with the form holes, grooves and lines aligned with the board holes, grooves and lines; said grooves being of greater width than said holes and coextensive with a centrally orientated horizontal row of holes and a centrally orientated vertical row of holes, the indicators receivable in said grooves having the lower portions thereof of a greater cross-sectional area than the upper portions, the cross-sectional area of the upper portions of the groove indicators being the same as the cross-sectional area of the hole indicators, said upper portions being receivable in said holes.

2. The device of claim 1 wherein said groove indicators include blind bores in the lower ends thereof, said bores being of a size capable of receiving the upper portions of the groove indicators as well as the hole indicators thus allowing a stable stacking of the indicators.

3. A mathematical teaching aid comprising a flat board provided with a plurality of holes in one face thereof, said holes being arranged in the pattern of a rectangular grid representing points in two dimensional space, said board further including, in said one face, a single horizontal centrally orientated groove and a single vertical centrally orientated groove representing rectangular coordinate axes, horizontal and vertical lines extending through the centers of all of the holes so as to provide a rectangular graph on said one face, and indicators freely receivable within said holes and said grooves in a manner so as to project outwardly therefrom, said grooves being of greater width than said holes and coextensive with a centrally orientated horizontal row of holes and a centrally orientated vertical row of holes, the indicators receivable in said grooves having the lower portions thereof of a greater cross-sectional area than the upper portions, the cross-sectional area of the upper portions of the groove indicators being the same as the cross-sectional area of the hole indicators, said upper portions being receivable in said holes.

4. The device of claim 3 wherein the said grooves indicators include blind bores in the lower ends thereof, said bores being of a size capable of receiving the upper portions of the groove indicators as well as the hole indicators thus allowing a stable stacking of the indicators.

References Cited by the Examiner

UNITED STATES PATENTS

| 1,541,179 | 6/25 | Parkinson | 35—34 |
| 1,981,646 | 11/34 | Hamley | 35—34 X |
| 2,981,009 | 4/61 | Lindquist | 35—73 X |
| 3,032,893 | 5/62 | Debeh | 35—34 X |
| 3,083,475 | 4/63 | Lepoudre | 35—30 |
| 3,083,901 | 4/63 | Gabriel. | |

FOREIGN PATENTS

| 1,239,655 | 7/60 | France. |
| 608,350 | 9/48 | Great Britain. |

JEROME SCHNALL, *Primary Examiner.*

LEO SMILOW, LAWRENCE CHARLES, LEONARD W. VARNER, *Examiners.*